(12) United States Patent
Song et al.

(10) Patent No.: US 10,447,326 B2
(45) Date of Patent: Oct. 15, 2019

(54) MOBILE TERMINAL WITH AN ANTENNA HAVING A FEEDING PORTION DISPOSED IN TERMINAL BODY

(71) Applicant: LG ELECTRONICS INC., Seoul (KR)

(72) Inventors: Insu Song, Seoul (KR); Jaewook Lee, Seoul (KR); Yunhoon Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/968,179

(22) Filed: May 1, 2018

(65) Prior Publication Data

US 2019/0081654 A1 Mar. 14, 2019

(30) Foreign Application Priority Data

Sep. 8, 2017 (KR) .................. 10-2017-0115313

(51) Int. Cl.
*H04M 1/00* (2006.01)
*H04B 1/3888* (2015.01)
(Continued)

(52) U.S. Cl.
CPC ........... *H04B 1/3888* (2013.01); *H01Q 1/243* (2013.01); *H01Q 1/38* (2013.01); *H01Q 1/48* (2013.01); *H01Q 9/42* (2013.01); *H01Q 21/28* (2013.01)

(58) Field of Classification Search
CPC .. H04Q 1/243; H04M 1/0249; H04M 4/1395; H04M 2/0275; H04B 1/3888
(Continued)

(56) References Cited

U.S. PATENT DOCUMENTS 6,448,933 B1 9/2002 Hill et al.
8,275,327 B2 * 9/2012 Yi .......................... G04G 21/04
455/556.1
(Continued)

FOREIGN PATENT DOCUMENTS

EP 2752942 7/2014
EP 3190713 7/2017
(Continued)

OTHER PUBLICATIONS

European Patent Office Application Serial No. 18177675.8, Search Report dated Dec. 13, 2018, 10 pages.
(Continued)

*Primary Examiner* — William D Cumming
(74) *Attorney, Agent, or Firm* — Lee, Hong, Degerman, Kang & Waimey PC

(57) ABSTRACT

A mobile terminal includes: a terminal body; an antenna portion having a feeding portion disposed in the terminal body; a metal case which forms appearance of the terminal body, and configured to support inside of the terminal body; and a molding portion formed at a region of the metal case, wherein the metal case includes a side region which forms a side surface of the terminal body and including a radiation region implemented as a radiator of the antenna portion; and a connection protrusion extended from the radiation region and connected to the feeding portion, and wherein the side region is provided with a plurality of slits, and the molding portion is formed at the plurality of slits so as to divide the radiation region.

11 Claims, 5 Drawing Sheets

(51) Int. Cl.
*H01Q 1/24* (2006.01)
*H01Q 1/38* (2006.01)
*H01Q 1/48* (2006.01)
*H01Q 9/42* (2006.01)
*H01Q 21/28* (2006.01)

(58) Field of Classification Search
USPC .............................. 455/90.3, 556.1; 343/702
See application file for complete search history.

(56) References Cited

U.S. PATENT DOCUMENTS

| | | | | |
|---|---|---|---|---|
| 8,462,490 | B2* | 6/2013 | Shin | B29C 45/14811 |
| | | | | 361/679.01 |
| 8,618,991 | B2* | 12/2013 | Jung | H01Q 1/243 |
| | | | | 343/702 |
| 9,337,882 | B2* | 5/2016 | Song | H04B 1/3888 |
| 9,627,754 | B2* | 4/2017 | Na | H01Q 5/371 |
| 9,680,206 | B2* | 6/2017 | Youn | H04M 1/0249 |
| 9,755,298 | B2* | 9/2017 | Choi | H01Q 1/243 |
| 9,768,821 | B2* | 9/2017 | Kim | H04M 1/0266 |
| 9,819,383 | B2* | 11/2017 | Youn | H04M 1/0249 |
| 9,985,679 | B2* | 5/2018 | Youn | H04M 1/0249 |
| 10,122,401 | B2* | 11/2018 | Youn | H04M 1/0249 |
| 10,153,539 | B2* | 12/2018 | Seo | H04B 1/006 |
| 10,277,265 | B2* | 4/2019 | Yoo | A45F 5/00 |
| 10,305,165 | B2* | 5/2019 | Hahn | H01Q 1/243 |
| 2008/0094303 | A1 | 4/2008 | Tseng et al. | |
| 2010/0112964 | A1* | 5/2010 | Yi | G04G 9/0064 |
| | | | | 455/90.3 |
| 2012/0105287 | A1* | 5/2012 | Jung | H01Q 1/243 |
| | | | | 343/702 |
| 2015/0155614 | A1* | 6/2015 | Youn | H04M 1/0249 |
| | | | | 343/702 |
| 2015/0171911 | A1 | 6/2015 | Yang | |
| 2016/0197396 | A1* | 7/2016 | Choi | H01Q 1/243 |
| | | | | 343/702 |
| 2016/0254590 | A1* | 9/2016 | Seo | H04B 1/006 |
| | | | | 343/876 |
| 2016/0315296 | A1* | 10/2016 | Kimura | H01M 2/0275 |
| 2017/0064052 | A1 | 3/2017 | Chang et al. | |
| 2017/0230073 | A1* | 8/2017 | Youn | H04M 1/0249 |
| 2017/0244153 | A1 | 8/2017 | Chen et al. | |
| 2017/0338470 | A1* | 11/2017 | Inoue | H01M 4/1395 |
| 2018/0041239 | A1* | 2/2018 | Youn | H04M 1/0249 |
| 2018/0241430 | A1* | 8/2018 | Youn | H04M 1/0249 |
| 2019/0007085 | A1* | 1/2019 | Youn | H04M 1/0249 |
| 2019/0081653 | A1* | 3/2019 | Song | H04B 1/3888 |

FOREIGN PATENT DOCUMENTS

| | | |
|---|---|---|
| KR | 101558550 | 10/2015 |
| KR | 1020160027700 | 3/2016 |
| KR | 1020160098099 | 8/2016 |
| KR | 1020170092794 | 8/2017 |

OTHER PUBLICATIONS

Korean Intellectual Property Office Application No. 10-2017-0115313, Notice of Allowance dated Dec. 19, 2018, 2 pages.

* cited by examiner

MOBILE TERMINAL WITH AN ANTENNA HAVING A FEEDING PORTION DISPOSED IN TERMINAL BODY

CROSS-REFERENCE TO RELATED APPLICATION

Pursuant to 35 U.S.C. § 119(a), this application claims the benefit of earlier filing date and right of priority to Korean Patent Application No. 10-2017-0115313, filed on Sep. 8, 2017, the contents of which are hereby incorporated by reference herein in its entirety.

BACKGROUND OF THE INVENTION

1. Field of the Invention

This specification relates to a waterproof type mobile terminal having a metal case.

2. Background of the Invention

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs. Various attempts have been made to implement complicated functions in such a multimedia device by means of hardware or software.

Recently, a terminal device having a case formed of a metallic material for a sophisticated appearance is being developed. However, the case formed of a metallic material is heavy, and has a disadvantage that a fabrication process for forming a plurality of holes and ribs in order to form the metallic case is complicated. Further, in case of forming an antenna radiator by using the metallic case, an antenna quality may be lowered due to a shape of the case and noise occurring from inner electronic components.

SUMMARY OF THE INVENTION

Therefore, an aspect of the detailed description is to provide a mobile terminal capable of enhancing a function of an antenna device by using a metal frame.

To achieve these and other advantages and in accordance with the purpose of this specification, as embodied and broadly described herein, there is provided a mobile terminal, including: a terminal body; an antenna portion having a feeding portion disposed in the terminal body; a metal case which forms appearance of the terminal body, and configured to support inside of the terminal body; and a molding portion formed at a region of the metal case, wherein the metal case includes a side region which forms a side surface of the terminal body and including a radiation region implemented as a radiator of the antenna portion; and a connection protrusion extended from the radiation region and connected to the feeding portion, and wherein the side region is provided with a plurality of slits, and the molding portion is formed at the plurality of slits so as to divide the radiation region. Since the radiation region is formed by the slits having their one region etched and by the molding portion filled in the slits, an electrical contact of the radiation region to another region of the metal case may be prevented.

In an embodiment, since the feeding portion and the radiation region are electrically connected to each other by the connection protrusion extended from the radiation region, a front molding portion and a rear molding portion may be formed on both surfaces of a third region which forms the connection protrusion. Accordingly, a distance between a display panel and the radiation region may be obtained, and thus noise generated from a display may be minimized.

In an embodiment, since a metal frame including the radiation region is formed to have the same thickness, a radiation quality of the radiation region may be enhanced.

Effects of the Present Invention

In the present invention, since the metal case, the radiation region and the connection protrusion are integrally formed from a base portion of a plate shape, fabrication processes may be simplified. Further, since the radiation region has a constant thickness, a radiation quality may be enhanced.

Further, since the molding portion is formed in the radiation region, a distance between the radiation region and electronic components inside the terminal body may be maximized. This may minimize occurrence of noise from the electronic components.

Further, the slits for forming the radiation region are implemented by the openings formed as the plate-shaped base portion is etched, and by the integral molding portion filled in the openings. This may prevent separation of the molding portion which divides the radiation region from the metal case, or may prevent a contact of the radiation region to another region of the metal case.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Figure 1A:
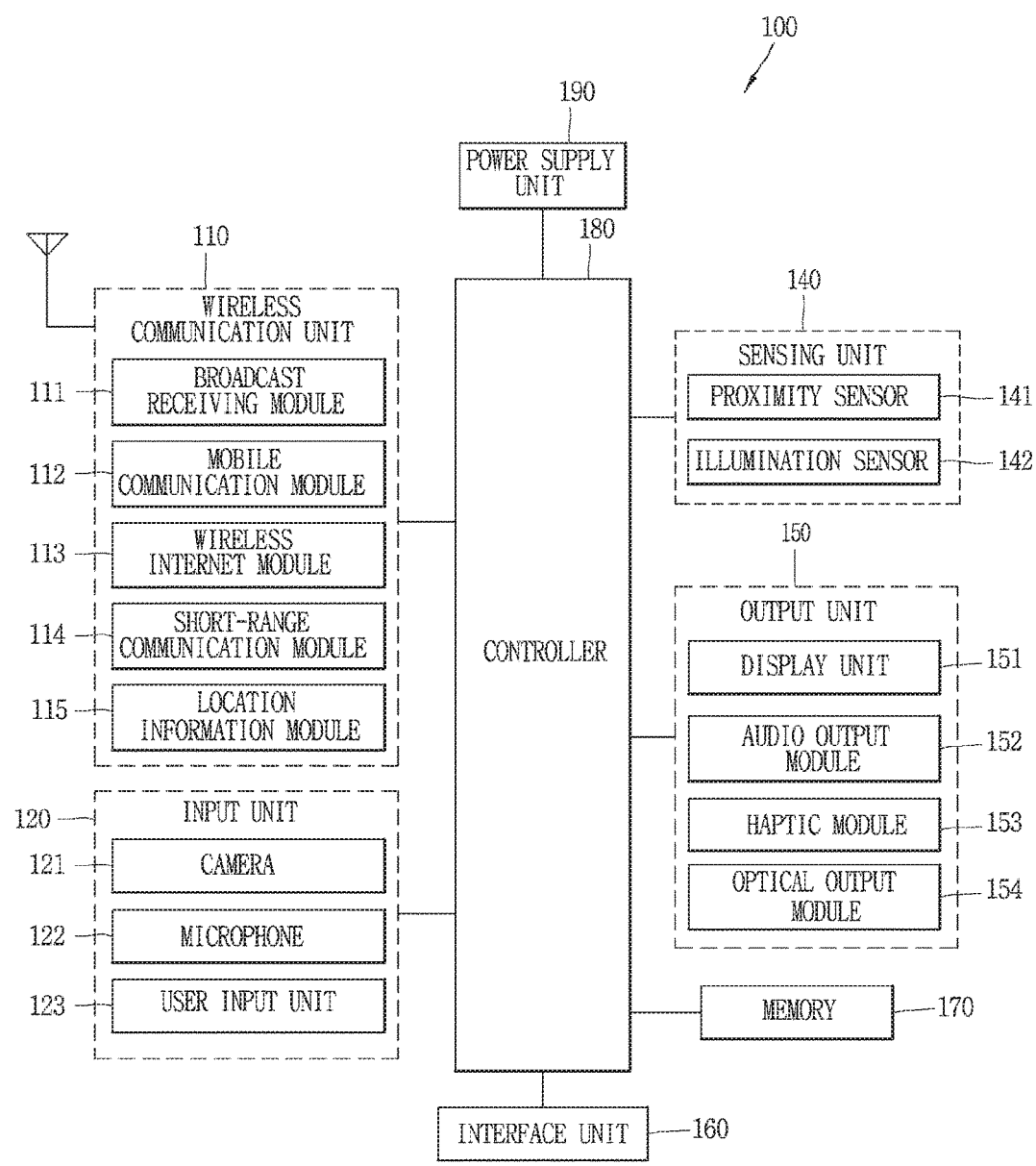
FIG. 1A is a block diagram for explaining a mobile terminal according to the present invention.

FIG. 1A is a block diagram of a mobile terminal 100 in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

The mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method for a glass type terminal according to various embodiments to be explained later. The operation or the control method for the glass type terminal may be implemented on the glass type terminal by driving at least one application program stored in the memory 170.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Figure 1B:
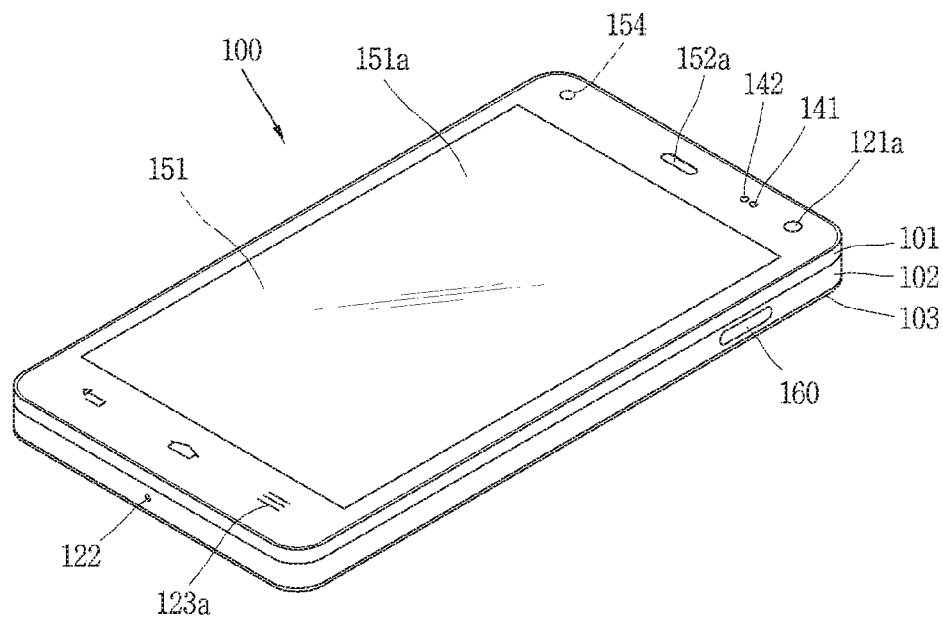
FIGS. 1B and 1C are conceptual views illustrating a mobile terminal according to an embodiment of the present invention, which are viewed from different directions.
Figure 1C:
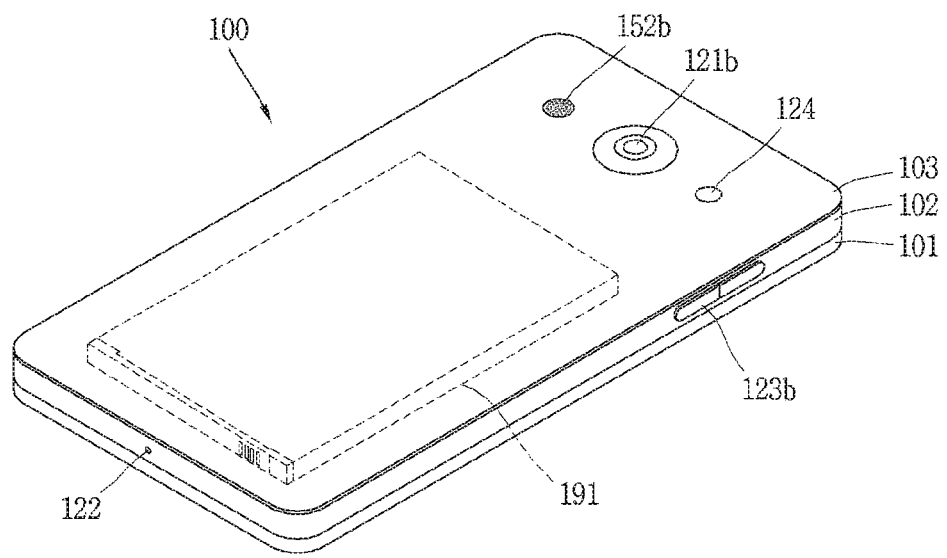

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151*a* of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121*b* or an audio output module 152*b*.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151*a* and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123*a* may be located on another surface of the terminal body, and the second audio output module 152*b* may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151*a* and a display on a rear surface of the window 151*a*, or a metal wire which is patterned directly on the rear surface of the window 151*a*. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123*a*.

The first audio output module 152*a* may be implemented in the form of a speaker to output voice audio, alarm sounds, multimedia audio reproduction, and the like.

The window 151*a* of the display unit 151 will typically include an aperture to permit audio generated by the first audio output module 152*a* to pass. One alternative is to allow audio to be released along an assembly gap between the structural bodies (for example, a gap between the window 151*a* and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2A:
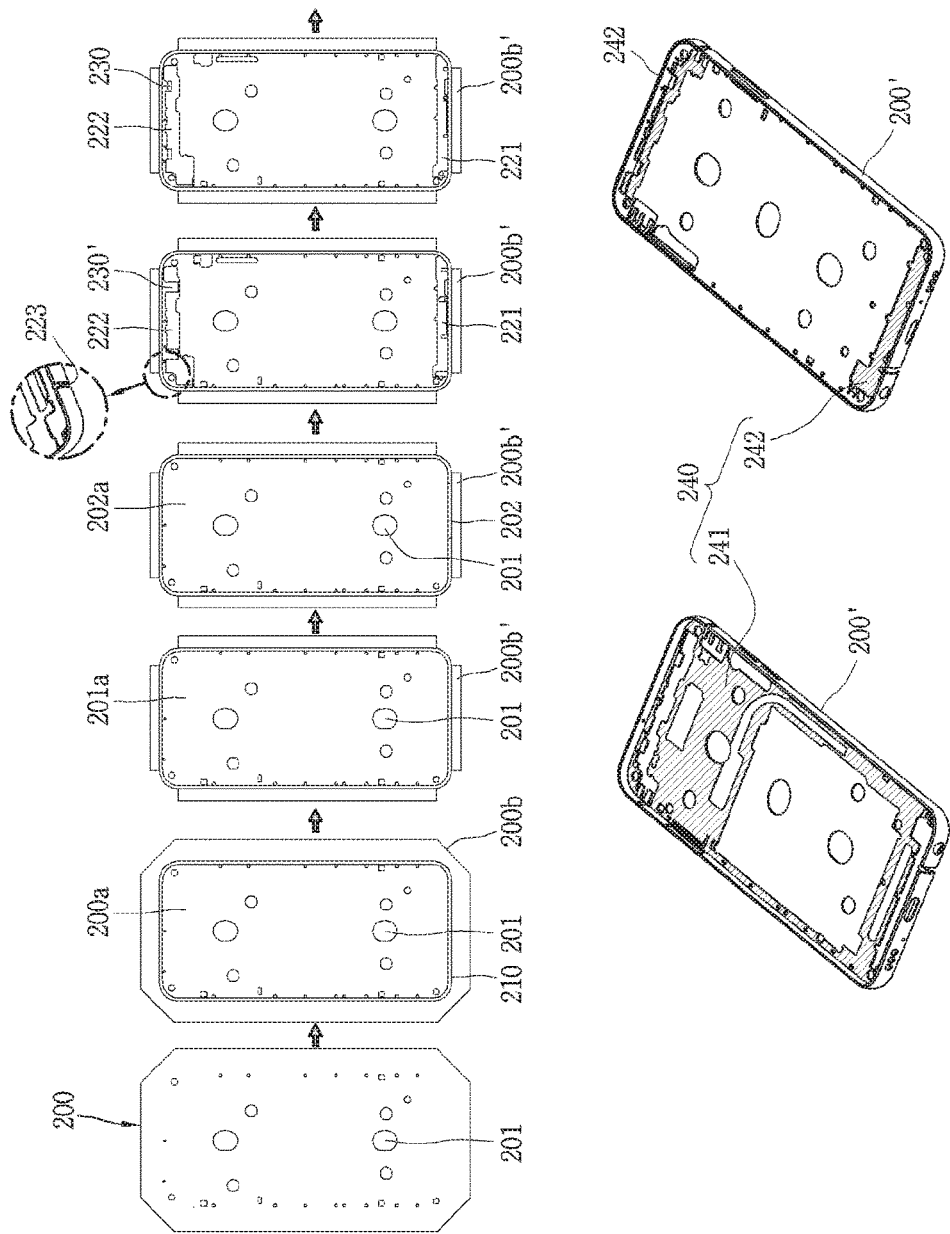
FIG. 2A is a conceptual view for explaining fabrication processes of a metal case according to the present invention.
Figure 2B:
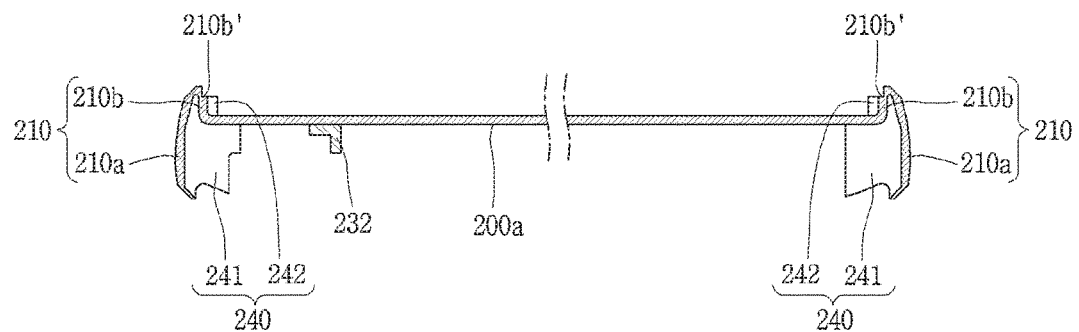
FIG. 2B is a sectional view of a metal case where a molding portion is mounted.

FIG. 2A is a conceptual view for explaining fabrication processes of a metal case according to the present invention. And FIG. 2B is a sectional view of a metal case where a molding portion is mounted.

The metal case according to the present invention is formed by a base member 200 of a plate shape. The base member 200 includes a plurality of first holes 201 (piercing step). The first holes 201 may correspond to assembly holes for assembling a case, a circuit board, etc., or correspond to openings for mounting electronic components and a flexible printed circuit board. The first holes 201 are formed to have different sizes.

As a pressure is applied to the base member 200 having the plurality of first holes 201, a side region 210 is formed. Referring to FIGS. 2A and 2B, a pressure is applied to one surface of the base member 200 to form a first region 210a, and a pressure is applied to another surface of the base member 200 to form a third region 210b.

A side surface of the side region 210 may have a curved shape by a pressure. The curved shape may be formed in the side region 210. The curved shape formed on an inner circumferential surface of the side region 210 may facilitate mounting of a molding portion to the side region 210, and may minimize separation of the molding portion.

The third region 210b is formed to be overlapped with the first region 210a. The third region 210b is bent from the first region 210a. Since the first and third regions 210a, 210b have an overlapped region, a side surface of the terminal body may have an enhanced intensity. Further, since the metal case is elastically transformable by an external impact due to the overlapped shape of the first and third regions 210a, 210b, the metal case may have an enhanced durability.

Once the side region 210 is formed by a pressure applied to the front surface and the rear surface, a second region 200a for supporting electronic components inside the terminal body is formed in the side region 210. A remaining region 200b is formed outside the side region 210. The remaining region 200b may form the side region 210, and a remaining region 200b' thereof may be removed.

After the side region 210 is formed, a plurality of openings 221, 222 are formed at the second region 200a of the base member 200. The openings 221, 222 are formed at upper and lower parts of the base member 200, and are formed in the side region 210. Further, the side region 210 may also include openings. The side region 210 may include slits 223 exposed to an outer surface of the terminal body. A part of the side region 210 formed of a metallic material and divided by the slits 223 is implemented as a radiator of an antenna portion 110, the radiator having a specific frequency band.

Since the base member 200 is formed as a metallic plate having a constant thickness, the side region 210 of the base member 200 has a constant thickness. Accordingly, a radiation region which constitutes an antenna may have an enhanced radiation quality.

A plurality of protrusions 232 protruded from the second region 200a and the side region 210 are formed by the openings 221, 222. The plurality of protrusions 232 are formed to have a plane. In a next step, a pressure may be applied to the plurality of protrusions 232 to bend the plurality of protrusions 232. The bent protrusions 232 may be formed on a plane different from the second region 200a, and may electrically connect one region of the metal case to a circuit board 181, etc.

The second region 200a, the side region 210, the plurality of protrusions 232, and a plurality of ribs which constitute the metal case are integrally formed with each other, and do not have a disconnected structure even if openings and slits are formed. This may not require a coupling member, an adhesion member, etc. for connecting the disconnected structure, thereby implementing the simple and light metal case.

After the side region 210 and the plurality of slits 223 are formed, a chemical etching step is performed before the molding portion is formed. As the transformed base member 200' undergoes the chemical etching step, the molding portion can be easily-adhered.

After the metal case 200' has a completed shape, a molding portion 240 is formed. The molding portion 240 is formed by an injection molding method. The molding portion 240 includes a rear molding portion 241 and a front molding portion 242. The rear molding portion 241 and the front molding portion 242 are formed to have a closed loop shape, and are formed along an inner circumferential surface of the side region 210. A part of the plurality of openings is filled with the molding portion 240. Further, the molding portion 240 may be formed at a part of the openings formed at the second region 200a.

Since the molding portion 240 is formed to have a closed loop along the inner circumferential surface of the side region 210, it may be prevented from being separated from the metal case 200'.

Referring to FIG. 2B, the molding portion 240 includes the rear molding portion 241 formed between the first and third regions 210a, 210b. A side surface structure of the terminal body, which includes the rear molding portion 241, may have a smaller weight than that of the terminal body formed of only a metallic material.

Referring to FIG. 2B, the third region 210b may include a stair-stepped portion 210b' formed by a pressure. And the front molding portion 242 may be formed to have the same plane as the stair-stepped portion 210b'. For instance, the window 151a may be supported at the front molding portion 242 and the stair-stepped portion 210b' of the third region 210b.

The metal case according to an embodiment is implemented as openings formed by applying a pressure to a metallic plate for transformation, and by etching the metallic plate. Accordingly, the metal case has the same thickness at each region. Further, the side surface of the terminal body may have an enhanced elastic force and durability by the first and third regions 210a, 210b of the side region 210 overlapped with each other. The side surface of the terminal body has a thickness as the molding portion is formed between the first and third regions. In this case, the mobile terminal may have a smaller weight than when the side surface of the terminal body is formed of only a metallic material.

Since the molding portion is implemented in the form of a closed loop along the side region, separation of the molding portion from the metal case may be prevented.

In the metal case according to an embodiment, a part of the side region 210 which forms the appearance of the terminal body may be implemented as a radiator of the antenna portion 110. Hereinafter, the antenna portion 110 will be explained.

Figure 3A:
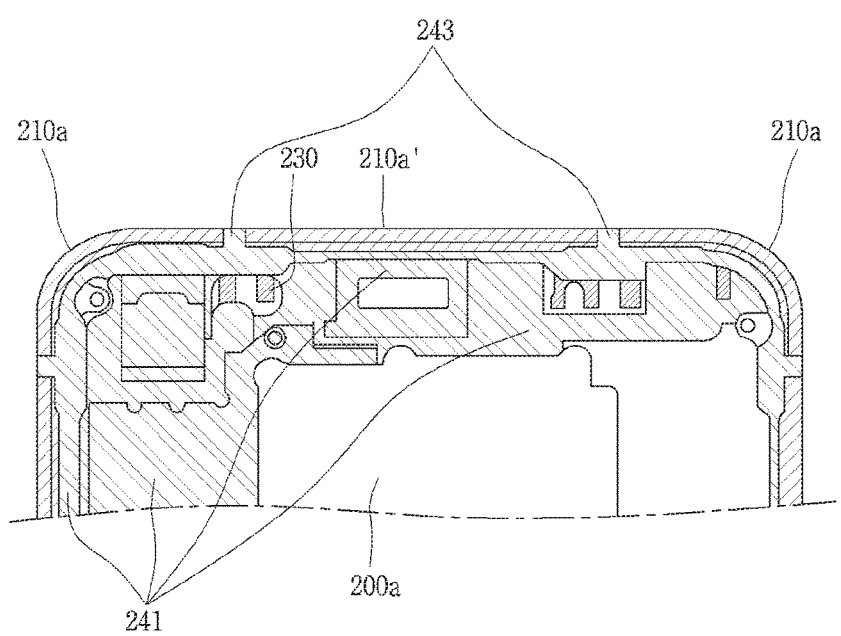
FIG. 3A is a conceptual view showing a radiation region formed at a metal frame in order to explain a radiator of an antenna portion.

FIG. 3A is a partial conceptual view showing a radiation region formed at a metal frame in order to explain the radiator of the antenna portion.

Referring to FIG. 3A, a radiation length of the antenna portion 110 is formed by a part of the first region 210a which forms the appearance of the terminal body, and by a part of the third region 210b extended from the part of the first region 210a, among the side region 210. That is, a specific region of the first and third regions 210a, 210b formed integrally is implemented as a radiator of the antenna portion 110 which radiates at a specific frequency band.

A radiation region 210a', a region of the first region 210a is partitioned from a remaining region by the slits 223 formed at the first region 210a (refer to FIG. 2A) and by a slit molding portion 243 formed at the slits 223. Further, the radiation region 210a' is electrically disconnected from the second region 200a by the opening 222 (refer to FIG. 2A) and the rear molding portion 241 formed at the opening 222. Accordingly, the radiation region 210a' is electrically disconnected from a remaining region of the metal case 200'.

The radiation region 210a' is formed by the slits 223 formed by etching, and by the slit molding portion 243 filled in the slits 223. And the slit molding portion 243 is integrally formed with a remaining region of the rear molding portion 241 formed on the second region 200a. Thus, since an insulating material which divides the radiation region 210a', that is, the slit molding portion 243 is separated, there is no possibility of an electrical contact between the radiation region 210a' and other region. This may allow the radiation region of the antenna portion to be implemented more stably.

The radiation region 210a' is electrically connected to a feeding portion disposed on the circuit board 181 by a region extended from the radiation region 210a'.

Although not shown, an additional antenna pattern may be formed on the rear molding portion 241 and the front molding portion 242. A frequency band of the antenna portion may be set by the additional antenna pattern.

Since the additional antenna pattern is formed on the rear molding portion 241 and the front molding portion 242 which are adjacent to the radiation region 210a' and formed of an insulating material, a structure such as an insulating carrier for forming an antenna pattern is not required. Accordingly, the mobile terminal may have a simplified inner structure and a smaller weight.

Figure 3B:
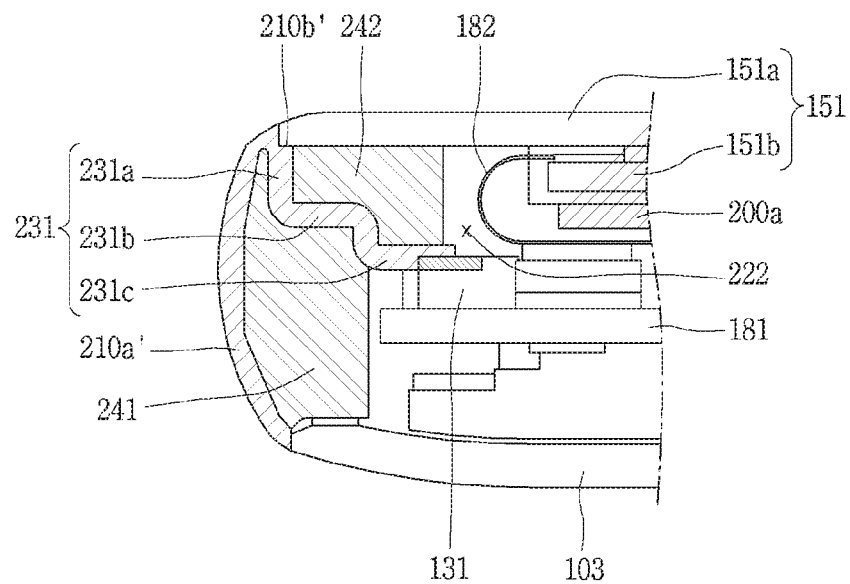
FIGS. 3B and 3C are conceptual views for explaining connection protrusions according to different embodiments.

FIGS. 3A and 3B are conceptual views for explaining the third region which forms an antenna length according to different embodiments.

A part of the third region 210b which forms an antenna length is referred to as 'first connection protrusion 231. The first connection protrusion 231 includes at least one bending portion, and is disconnected from the second region 200a by a bending structure.

Referring to FIG. 3B, a radiation length is formed by the first region 210a of the side region 210, and the third region 210b which constitutes the first connection protrusion 231. First to third bending portions 231a, 231b, 231c are formed. The first bending portion 231a may be overlapped with the first region 210a, and the second bending portion 231b may be formed to be parallel to the second region 200a. The third bending portion 231c is further bent from the second bending region 231b, thereby electrically contacting the feeding portion 131. The first connection protrusion 231 electrically connects the radiation region 210a' to the feeding portion 131 disposed on the circuit board 181.

The first connection protrusion 231 is separated from the second region 200a by the opening 222. The second region 200a supports a display panel 151b. The circuit board 181 for electrically connecting the display panel 151b and the circuit board 181 with each other passes through the opening 222 formed between the second region 200a and the first connection protrusion 231.

An end part of the first connection protrusion 231 may contact the circuit board 181 disposed below the display panel 151b, by the bending shape of the first to third bending portions 231a, 231b, 231c.

The second and third bending portions 231b, 231c are formed by an additional pressing step after the opening 222 is are formed. Since the opening 222 is formed to enclose the first connection protrusion 231, the radiation region may be electrically disconnected from the remaining region of the metal case except for a connection part to the first connection protrusion 231.

Since the first connection protrusion 231 corresponds to a part of the base member 200, it is integrally formed with the radiation region 210a' of the first region 210a. Accordingly, an additional connection member for connecting the first region 210a to the feeding portion 131 is not required. Since an additional member such as a conductive coupling member and a flexible printed circuit board formed at a region which forms the appearance of the terminal body is not required, fabrication processes are simplified, and the terminal body may have a small weight.

The front molding portion 242 is formed on the first connection protrusion 231. The front molding portion 242 is filled in a region of the opening 222, and forms a separation space from the display panel 151b such that the flexible printed circuit board 182 passes therethrough.

The window 151a is supported on the front molding portion 242 and the stair-stepped portion 210b' of the first bending portion 231a included in the first connection protrusion 231. An edge of the window 151a is mounted to the stair-stepped portion 210b'. Although not shown, an adhesion member may be formed between the front molding portion 242 and the window 151a to adhere the window 151a.

The rear molding portion 241 is formed between the first connection protrusion 231 and the radiation region 210a'. However, the rear molding portion 241 is not necessarily disposed below the radiation region 210a', but is formed at a position near the remaining region of the first region 210a, rather than the radiation region 210a'.

The rear molding portion 241 is provided with an adhesion space where the rear cover 103 is mounted and the rear cover 103 can be adhered.

The rear molding portion 241 and the first region 210a (and the radiation region 210a') form a thickness of the case which forms the appearance of the terminal body.

Since the thickness of the case has a metal region which forms an outer surface of the mobile terminal and a molding region which forms the inside of the mobile terminal, a weight of the case may be minimized. That is, the case may have a smaller weight than when it is formed of only a metallic material.

The radiation region 210a' of the antenna portion, the display panel 151b, and the circuit board 181 are spaced from each other by the rear molding portion 241 and the front molding portion 242. Since a distance between the radiation region 210a' and the display panel 151b becomes long, noise influencing on a radiation function of the radiation region 210a' may be reduced.

If the thickness of the metal case which forms the terminal body is formed of a metallic material without a molding portion, the radiation region 210a' of the antenna portion is arranged relatively close to the display panel, etc. As a result, a radiation function is lowered due to noise generated from the display panel, electronic components arranged at the circuit board, etc. Since a distance between the radiation region and the electronic components disposed in the terminal body is obtained by the molding portion, a radiation quality of the antenna portion may be enhanced.

Since the radiator of the antenna portion is formed by the radiation region 210a' of the antenna portion and the first connection protrusion 231 from a plate-shaped base portion, the radiator of the antenna portion has the same thickness. This may allow a radiation function to be performed more stably.

Figure 3C:
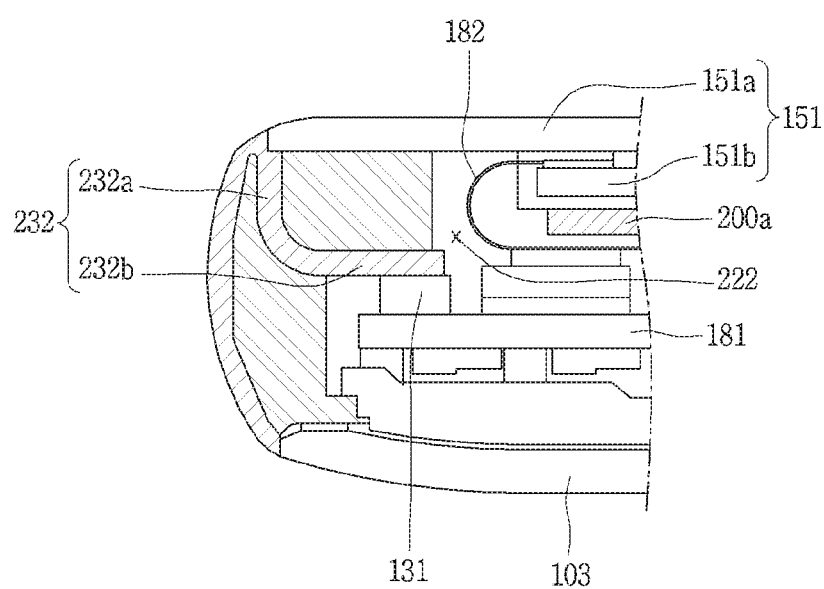

The components of the mobile terminal shown in FIG. 3C are the same as those of the mobile terminal shown in FIG. 3B. Thus, the same components will be provided with the same reference numerals, and explanations thereof will be omitted.

A second connection protrusion 232 shown in FIG. 3C includes a first bending portion 232a extended from the first region 210a of the side region 210 and partially overlapped with the first region 210a, and a second bending portion 232b extended from the first bending portion 232a. The second bending portion 232b electrically contacts the feeding portion 131. The second bending portion 232b is bent from the first bending portion 232a one time to be extended to have a plane, thereby having a different shape from the first connection protrusion 231 of FIG. 3B. The second bending portion 232b has a plane.

The second connection protrusion 232 is formed through a step of unfolding the second and third bending portions 231b, 231c after forming the first connection protrusion 231.

An end part of the second connection protrusion 232 forms a separation space (the opening 222) from the second region 200a, and the flexible printed circuit board 182 passes through the separation space. Since the wide separation space is obtained between the second connection protrusion 232 and the display panel 151b, a position where the flexible printed circuit board 182 is arranged may have a large area.

Since the second connection protrusion 232 has a shape bent one time, a distance between the second connection protrusion 232 and the display panel 151b becomes long. That is, since a distance between the second connection protrusion 232 extended from the radiation region 210a' and the display panel 151b is maximized, noise transferred from the display panel 151b and electronic components arranged on the circuit board 181 may be minimized.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
a terminal body;
a display;
an antenna comprising a feeding portion disposed in the terminal body; and
a metal case comprises:
a first region which forms a side surface of the terminal body;
a second region configured to support the display; and
a third region between the first and second region and angled from the second region, the third region being bent from the first region and being overlapped with the first region,
wherein the first, second, and third regions are integrally formed with each other,
wherein the metal case further comprises openings disposed between the first region and the second region so that the third region is not connected to the second region, and
wherein the third region is connected to the feeding portion to form an electric length of the antenna together with a part of the first region.

2. The mobile terminal of claim 1, wherein the part of the first region is defined by slits on both sides of the part of the first region, and
wherein molding portions are disposed at the openings.

3. The mobile terminal of claim 2, wherein the molding portions comprise a front molding portion disposed adjacent to the third region and the second region.

4. The mobile terminal of claim 3, wherein the display comprises a window which forms an outer surface of the terminal body and a display panel disposed below the window, and
wherein the front molding portion is configured to support the window.

5. The mobile terminal of claim 4, wherein the third region further comprises a stepped portion configured to contact the window.

6. The mobile terminal of claim 4, wherein the molding portions comprise a rear molding portion disposed between the first and third regions and adjacent to a part of the second region, and
wherein the rear molding portion is disposed at an inner surface of the first region between the display panel and the part of the first region to reduce transmission of electrical noise from the display panel to the antenna.

7. The mobile terminal of claim 6, wherein:
the mobile terminal further comprises a circuit board;
the feeding portion is disposed below the second region and between the display panel and the first region;
the third region comprises at least one bent portion connected to the feeding portion; and
the front molding portion is disposed on the at least one bent portion.

8. The mobile terminal of claim 7, wherein the third region further comprises:
a first bent portion overlapped with the first region;
a second bent portion bent from the first bent portion and disposed to be parallel to the second region; and
a third bent portion bent from the second bent portion and configured to contact the feeding portion.

9. The mobile terminal of claim 7, wherein the third region further comprises:

a first bent portion overlapped with the first region and disposed to be separated from the display panel; and a second bent portion bent from an end part of the first bent portion and disposed to be parallel to the second region, wherein the second bent portion is configured to contact the feeding portion.

10. The mobile terminal of claim 6, further comprising a rear cover coupled to the rear molding portion and configured to form a rear surface of the terminal body.

11. The mobile terminal of claim 1, wherein the metal case has a constant thickness.

* * * * *